United States Patent
Nakashima

(10) Patent No.: US 10,411,574 B2
(45) Date of Patent: Sep. 10, 2019

(54) MOTOR CONTROLLER

(71) Applicant: DENSO CORPORATION, Kariya, Aichi-pref. (JP)

(72) Inventor: Kotaro Nakashima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 109 days.

(21) Appl. No.: 15/590,533

(22) Filed: May 9, 2017

(65) Prior Publication Data

US 2017/0331356 A1 Nov. 16, 2017

(30) Foreign Application Priority Data

May 11, 2016 (JP) ................. 2016-095225

(51) Int. Cl.

| | | |
|---|---|---|
| *H02K 17/30* | (2006.01) | |
| *H02K 23/66* | (2006.01) | |
| *G01D 5/14* | (2006.01) | |
| *H02K 9/06* | (2006.01) | |
| *H02K 21/04* | (2006.01) | |
| *H02M 7/5387* | (2007.01) | |

(Continued)

(52) U.S. Cl.
CPC .............. *H02K 23/66* (2013.01); *G01D 5/145* (2013.01); *H02K 3/28* (2013.01); *H02K 5/225* (2013.01); *H02K 9/06* (2013.01); *H02K 11/33* (2016.01); *H02K 17/30* (2013.01); *H02K 21/046* (2013.01); *H02M 7/5387* (2013.01); *H02M 2001/325* (2013.01)

(58) Field of Classification Search
CPC ........ H02K 23/66; H02K 17/30; H02K 21/04; H02K 9/06; H02K 3/28; H02K 5/225; H02K 11/33; H02K 21/046; G01D 5/14; G01D 5/145; H02M 7/5387; H02M 2001/325

See application file for complete search history.

(56) References Cited

U.S. PATENT DOCUMENTS

| | | | | |
|---|---|---|---|---|
| 8,421,288 B2 * | 4/2013 | Tang | ...................... | H02K 11/33 310/64 |
| 8,421,388 B2 * | 4/2013 | Mukai | .................. | B62D 5/0463 318/400.01 |

(Continued)

FOREIGN PATENT DOCUMENTS

| | | |
|---|---|---|
| JP | 2009-055657 | 3/2009 |
| JP | 2009055657 A * | 3/2009 |

*Primary Examiner* — Naishadh N Desai
(74) *Attorney, Agent, or Firm* — Knobbe, Martens, Olson & Bear, LLP

(57) ABSTRACT

An electronic control unit includes two inverters, a magnetic sensor, a failure detection unit, an inverter driving unit, a signal examination unit, and a failed element identification unit. The magnetic sensor detects a magnetic flux generated around a winding. The failure detection unit detects an ON-state failure of the inverter. When the ON-state failure is detected, the inverter driving unit stops driving the inverter to which the ON-state failure has been detected, and continues driving the other inverter. The signal examination unit examines a presence or absence of a special signal. When there is a signal appearing according to a special magnetic flux, the failed element identification unit identifies a failed switching element based on a motor electric angle generated by the signal.

7 Claims, 9 Drawing Sheets

(51) Int. Cl.
  *H02K 3/28*   (2006.01)
  *H02K 5/22*   (2006.01)
  *H02K 11/33*  (2016.01)
  *H02M 1/32*   (2007.01)

(56) References Cited

U.S. PATENT DOCUMENTS

| | | | | |
|---|---|---|---|---|
| 8,878,474 B2* | 11/2014 | Kezobo | ............... | H02P 29/0241 |
| | | | | 318/400.21 |
| 9,575,127 B2* | 2/2017 | Kezobo | ................ | B62D 5/0487 |
| 2005/0174090 A1* | 8/2005 | Hayashi | .................. | H02P 21/06 |
| | | | | 318/807 |
| 2013/0200827 A1* | 8/2013 | Kezobo | ................ | B62D 5/0487 |
| | | | | 318/400.21 |

* cited by examiner

MOTOR CONTROLLER

CROSS-REFERENCE TO RELATED APPLICATION

This application is based on and claims the benefit of priority from earlier Japanese Patent Applications No. 2016-95225 filed May 11, 2016, the description of which is incorporated herein by reference.

TECHNICAL FIELD

The present disclosure relates to a motor controller for controlling a motor having two systems of winding sets.

BACKGROUND

Conventionally, there is known a motor controller that generates a rotating magnetic field by switching an energization pattern of windings of each phase of winding sets by turning on/off a plurality of switching elements of an inverter to rotate a motor.

If the inverter fails to turn ON (ON-state failure) in such a motor controller, the rotation of the motor stops.

On the other hand, in Japanese Patent Application Laid-Open Publication No. 2009-55657, when an ON-state failure of an inverter is detected, a driving of a motor is stopped and it is identified which phase of the inverter has failed to turn ON.

Then, when restarting of the driving is possible, the driving of the motor is resumed by using a switching element of the normal phase.

In Publication No. '657, it is not possible to drive the motor while identifying which phase of the inverter has occurred the ON-state failure.

Further, when the inverter is an H bridge circuit or the like, for example, and there is a plurality of switching elements constituting each phase of the inverter, it cannot be identified which switching element has failed to turn ON.

SUMMARY

An embodiment provides a motor controller capable of identifying a switching element that has failed to turn ON while continuing the driving of a motor.

An aspect of a motor controller for controlling a motor having two systems of winding sets, the motor controller includes two inverters each provided for each winding set, two inverters having a plurality of switching elements for switching energization and de-energization of windings of each phase of the winding sets, a magnetic sensor that detects a magnetic flux generated around the winding, a failure detection unit that detects an ON-state failure of the inverters, and an inverter driving section that continues to drive one of the inverters while stopping driving the other inverter in which the ON-state failure has been detected when the ON-state failure is detected by the failure detection unit.

The motor controller further includes a signal examination unit that examines a presence or absence of a special signal when among the plurality of switching elements included in the inverter that has been stopped, what corresponds to the ON-state failure location is defined as a failed switching element, a magnetic flux generated around the winding corresponding to the failed switching element by a brake current generated as the motor rotates when the ON-state failure occurs is defined as a special magnetic flux, and a signal appearing in accordance with the special magnetic flux among a waveform of an output signal of the magnetic sensor or a waveform after a predetermined process is applied to the output signal is defined as the special signal, and a failed element identification unit that identifies the failed switching element based on a motor electrical angle at which the special signal has been generated when the special signal is present.

As described above, according to the present disclosure, since the motor is driven by the other inverter even if one of the inverters fails to turn ON, it is not necessary to stop the driving of the motor when identifying the ON-state failure location.

Further, by utilizing the fact that the generation timing of the special magnetic flux is different for each switching element to which the ON-state failure occurs, it is possible to identify which switching element has failed to turn ON.

In this identification, the signal from the inverter that failed to turn ON is unnecessary.

Therefore, according to the present disclosure, it is possible to identify the switching element that has failed to turn ON while continuing the driving of the motor.

DETAILED DESCRIPTION OF THE PREFERRED EMBODIMENTS

Figure 1:
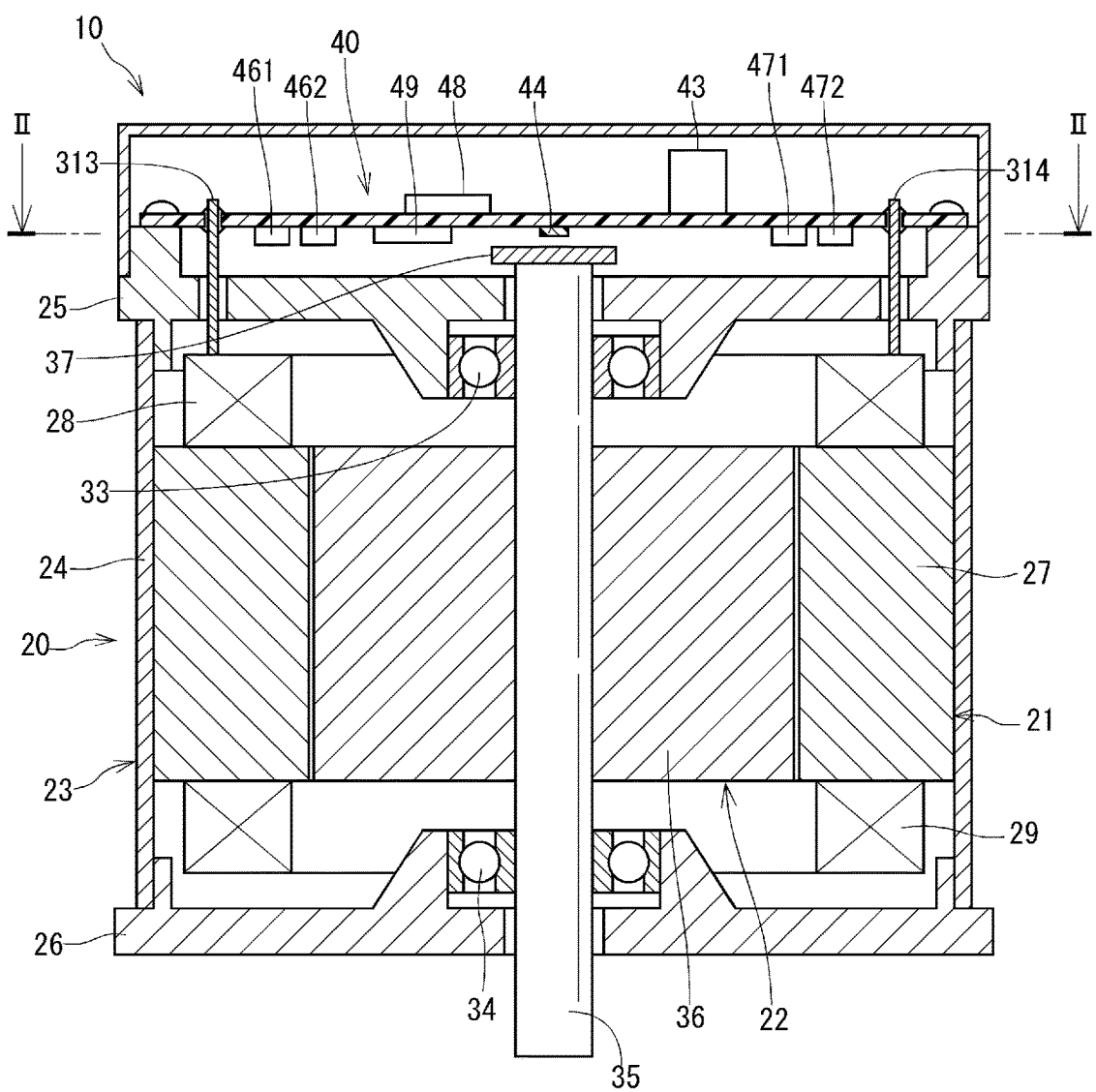
FIG. 1 shows a sectional view of a driving device to which an electronic control unit according to a first embodiment of the present disclosure is applied.

Hereinafter, embodiments of the present disclosure will be described with reference to the drawings.

In the embodiments, the same reference numerals are given to substantially the same components, and the description thereof is omitted.

First Embodiment

An electronic control unit as "a motor controller" according to a first embodiment of the present disclosure is applied to a driving device in FIG. 1.

A driving device 10 is used, for example, as a drive source of an electric power steering system that assists steering of a driver of a vehicle.

[Schematic Configuration of Driving Device 10]

First, a schematic configuration of the driving device 10 will be described with reference to FIGS. 1 and 2.

As shown in FIG. 1, the driving device 10 is an electro-mechanically integrated driving device in which a motor 20 and an electronic control unit 40 for controlling the motor 20 are integrally provided.

Hereinafter, an axial direction of the motor 20 is simply referred to as "an axial direction", and a radial direction of the motor 20 is simply referred to as "a radial direction".

The motor 20 includes a stator 21, a rotor 22, and a motor case 23 accommodating them.

The motor case 23 has a tubular portion 24, and a pair of frame ends 25, 26 sandwiching the tubular portion 24 in the axial direction.

The stator 21 has a stator core 27 fixed to the motor case 23, and two systems of winding sets 28, 29 provided in the stator core 27.

Figure 2:
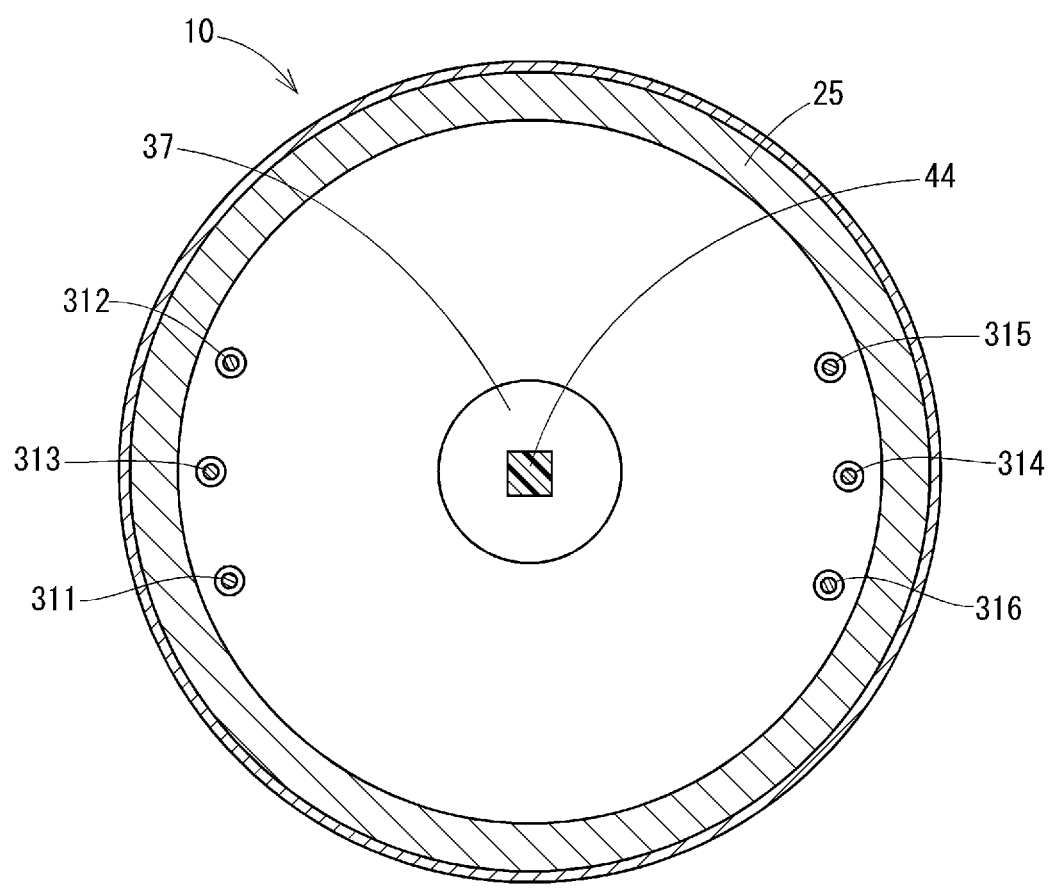
FIG. 2 shows a sectional view taken along a line II-II of the driving device of FIG. 1.

As shown in FIG. 1 and FIG. 2, lead wires 311 to 316 are extending from windings of each phase of the winding sets 28, 29 one by one.

The lead wires 311 to 316 are drawn out to the electronic control unit 40 side via through holes of the frame end 25.

The rotor 22 has a shaft 35 rotatably supported by bearings 33, 34, and a rotor core 36 fixed to the shaft 35.

A magnet 37 for detecting a rotation angle is provided at one end portion of the shaft 35.

The electronic control unit 40 is fixed to the frame end 25 outside the motor case 23, and is connected to the lead wires 311 to 316.

The electronic control unit 40 has electronic components such as an inverter and a microcomputer, which will be described later, and rotates the rotor 22 by generating a rotating magnetic field by switching an energization pattern of windings of each phase of the winding sets 28, 29 based on signals from various sensors.

[Circuit Configuration of Driving Device 10]

Next, a circuit configuration of the driving device 10 will be described with reference to FIG. 3.

Figure 3:
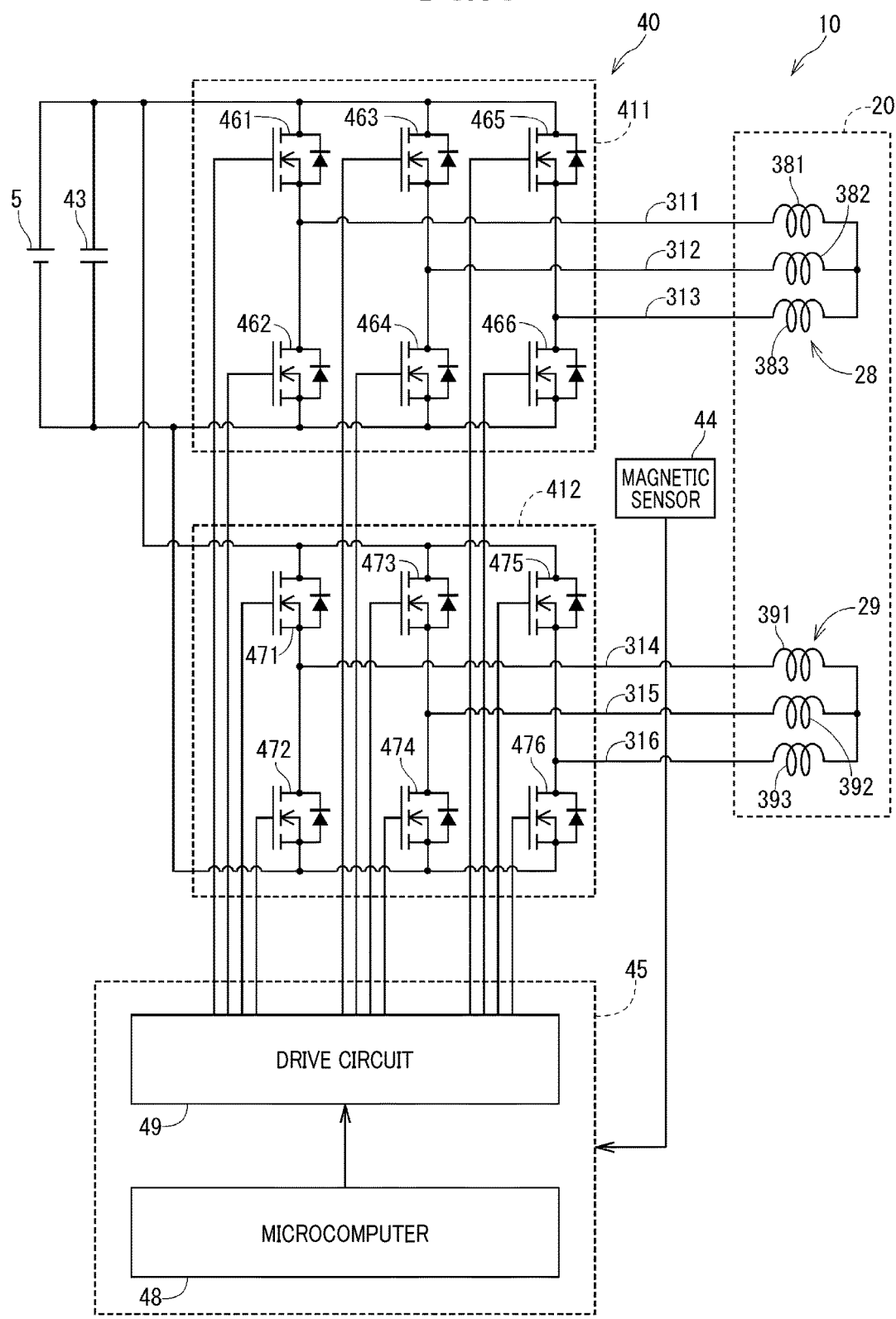
FIG. 3 shows a diagram showing a circuit configuration of the driving device of FIG. 1.

As shown in FIG. 3, the motor 20 is a three-phase brushless motor, and has the above-described two systems of winding sets 28, 29.

A first winding set 28 includes a U-phase winding 381, a V-phase winding 382, and a W-phase winding 383.

A second winding set 29 includes a U-phase winding 391, a V-phase winding 392, and a W-phase winding 393.

The electronic control unit 40 includes a first inverter 411, a second inverter 412, a capacitor 43, a magnetic sensor 44, and a control section 45.

The first inverter 411 has six switching elements 461 to 466 constituting an H bridge circuit.

The second inverter 412 has other six switching elements 471 to 476 constituting another H bridge circuit.

Hereinafter, in a case where the first inverter 411 and the second inverter 412 are not distinguished, they are described as the inverter 41.

The switching elements 461 to 466 and 471 to 476 are constituted of semiconductors such as MOSFETs, for example.

The switching elements 461, 463, 465, 471, 473, 475 are high-potential side switching elements connected to a positive electrode of a battery 5.

On the other hand, the switching elements 462, 464, 466, 472, 474, 476 are low-potential side switching elements connected to a negative electrode of the battery 5.

A connection point between the switching element 461 and the switching element 462 is connected to the U-phase winding 381 via a lead wire 311.

A connection point between the switching element 463 and the switching element 464 is connected to the V-phase winding 382 via a lead wire 312.

A connection point between the switching element 465 and the switching element 466 is connected to the W phase winding 383 via a lead wire 313.

A connection point between the switching element 471 and the switching element 472 is connected to the U-phase winding 391 via a lead wire 314.

A connection point between the switching element 473 and the switching element 474 is connected to the V-phase winding 392 via a lead wire 315.

A connection point between the switching element 475 and the switching element 476 is connected to the W phase winding 393 via a lead wire 316.

The first inverter 411 and the second inverter 412 turn on and off the switching elements 461 to 466 and 471 to 476 according to a drive signal outputted from the control section 45, thereby sequentially switching energization to the windings 381 to 383 and 391 to 393.

The capacitor 43 is connected in parallel with the battery 5 and the inverter 41.

The capacitor 43 accumulates charges for assisting power supply to the switching elements 461 to 466 and 471 to 476, and suppresses noise components such as a surge current from occurring.

The magnetic sensor 44 is composed of a magnetic sensor such as a TMR sensor, for example, and detects a rotation angle of the rotor 22 by detecting a rotating magnetic field accompanying the rotation of the magnet 37.

The control section 45 has a microcomputer 48 and a drive circuit 49.

The microcomputer 48 determines energization patterns of the windings 381 to 383 and 391 to 393 based on signals from a torque sensor (not shown), the magnetic sensor 44, and the like.

The drive circuit 49 generates the drive signals for three phases (that is, U-phase, V-phase, W-phase) based on the energization pattern, and outputs the drive signals to the switching elements 461 to 466 and 471 to 476.

As the switching elements 461 to 466 and 471 to 476 perform switching operation according to the drive signals, an alternating current flows through the windings 381 to 383 and 391 to 393.

As a result, the rotation of the motor 20 is controlled.

[Detailed Configuration of Electronic Control Unit 40]

Next, the detailed configuration of the electronic control unit 40 will be described with reference to FIGS. 2, and 4 to 6.

As shown in FIG. 2, the magnetic sensor 44 is disposed at a position inside in the radial direction with respect to the respective lead wires 311 to 316 and capable of detecting a magnetic flux generated around the current flowing through the lead wires 311 to 316.

Figure 4:
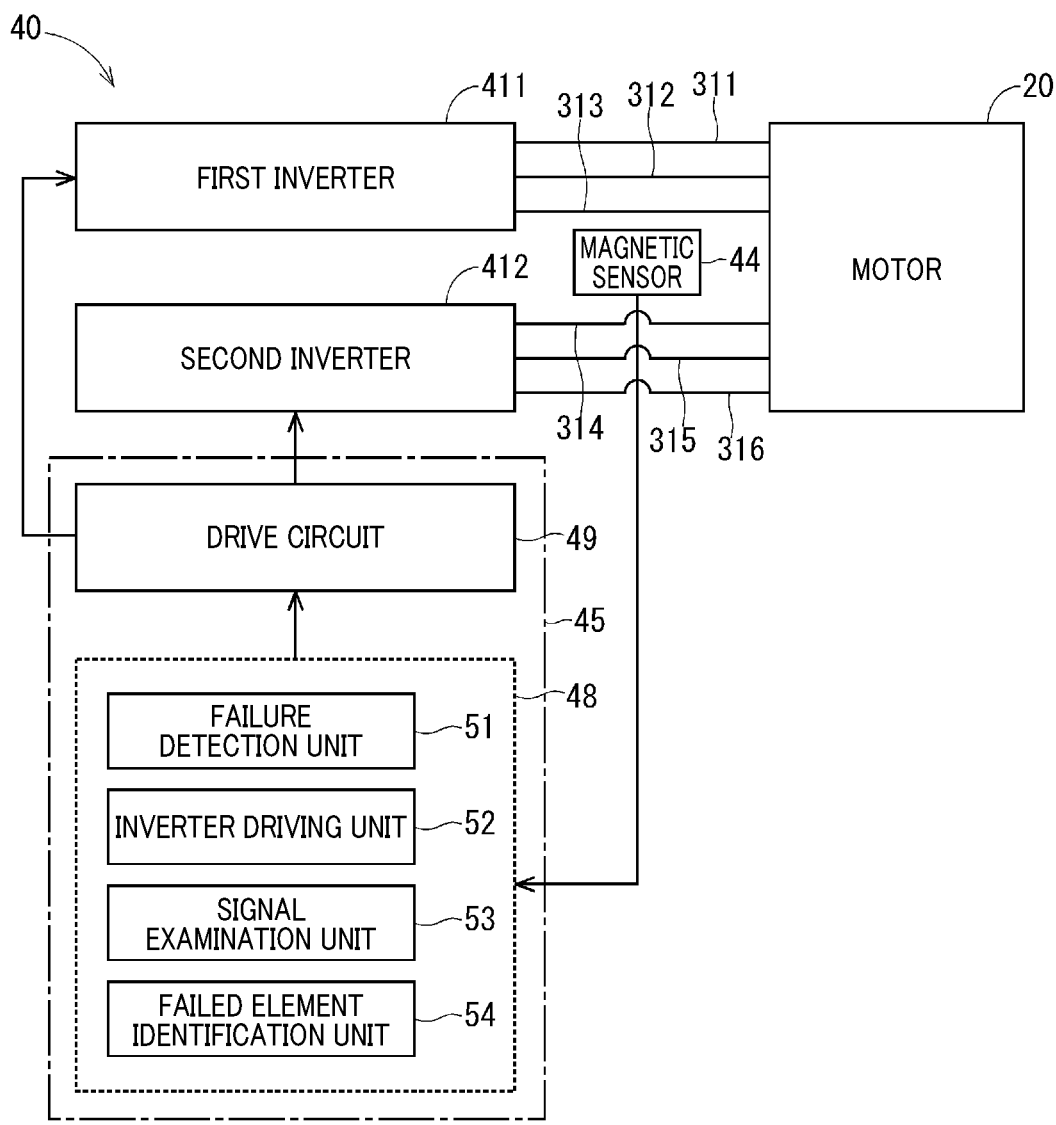
FIG. 4 is a block diagram for explaining a functional section included in a microcomputer of a control section in FIG. 3.

As shown in FIG. 4, the microcomputer 48 includes a failure detection unit 51, an inverter driving unit 52, a signal examination unit 53, and a failed element identification unit 54.

The failure detection unit 51 detects an ON-state failure of the inverter 41.

The failure detection unit 51 determines whether the inverter 41 is in the ON-state failure or not based on a signal from a current detection unit (not shown) that detects the current of, for example, the windings 381 to 383 and 391 to 393.

The inverter driving unit 52 determines the energization patterns of the windings 381 to 383 and 391 to 393 based on the signals from the magnetic sensor 44 or the like, and instructs the drive circuit 49.

Further, while stop driving the inverter 41 of which the ON-state failure has been detected, the inverter driving unit 52 continues driving the other inverter 41 when the ON-state failure of the inverter 41 is detected by the failure detection unit 51.

Here, among the plurality of switching elements included in the inverter 41 that has been stopped, what corresponds to the ON-state failure location is defined as "a failed switching element".

Further, a magnetic flux generated around the winding corresponding to the failed switching element by a brake current generated around the winding corresponding to the failed switching element among the windings 381 to 383, and 391 to 393 as the motor 20 rotates when the ON-state failure occurs is defined as "a special magnetic flux".

Further, each period when one cycle of an electrical angle θ of the motor is divided at the timing when the switching operation of the switching elements 461 to 466, and 471 to 476 is performed is defined as "an inter-switching period Ts".

In the present embodiment, the number of poles of the rotor 22 is, for example, ten, and five cycles of the electrical angle θ correspond to one cycle of a mechanical angle θm.

Then, the switching operation is performed six times while one cycle passes from a reference position of the electrical angle θ (i.e., the electrical angle θ=0).

Figure 5:
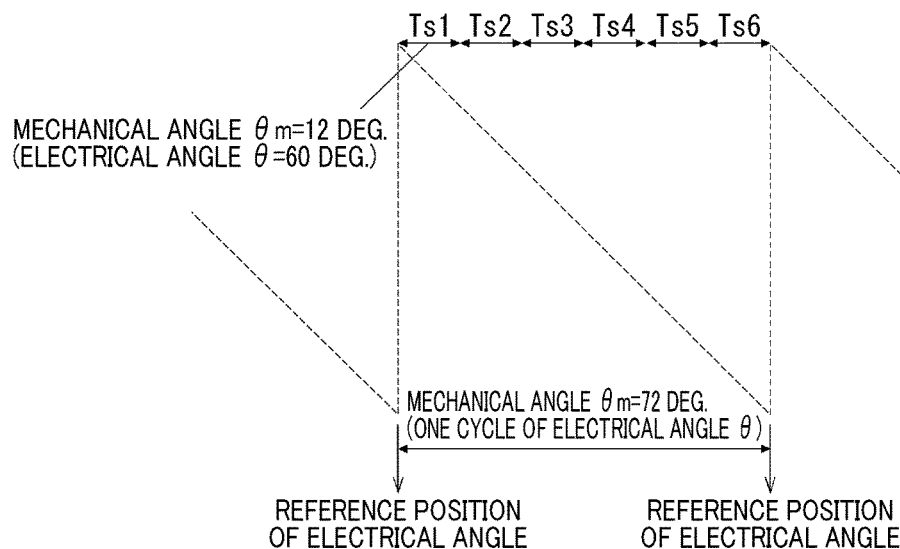
FIG. 5 shows a relationship between reference positions of an electrical angle and an inter-switching period of a motor in FIG. 3.

Therefore, as shown in FIG. 5, the inter-switching period Ts is 12 degrees at the mechanical angle θm, and is 60 degrees at the electrical angle θ.

The signal examination unit 53 examines the presence or absence of a signal (hereinafter referred to as a special signal) appearing in response to the special magnetic flux out of the waveform after the predetermined process is applied to the output signal of the magnetic sensor 44.

The predetermined process is a process for making it easy to distinguish a special signal, and is a signal process in which a previously obtained output signal is subtracted from an output signal obtained at the present time and a fixed gain is multiplied, for example.

Figure 6:
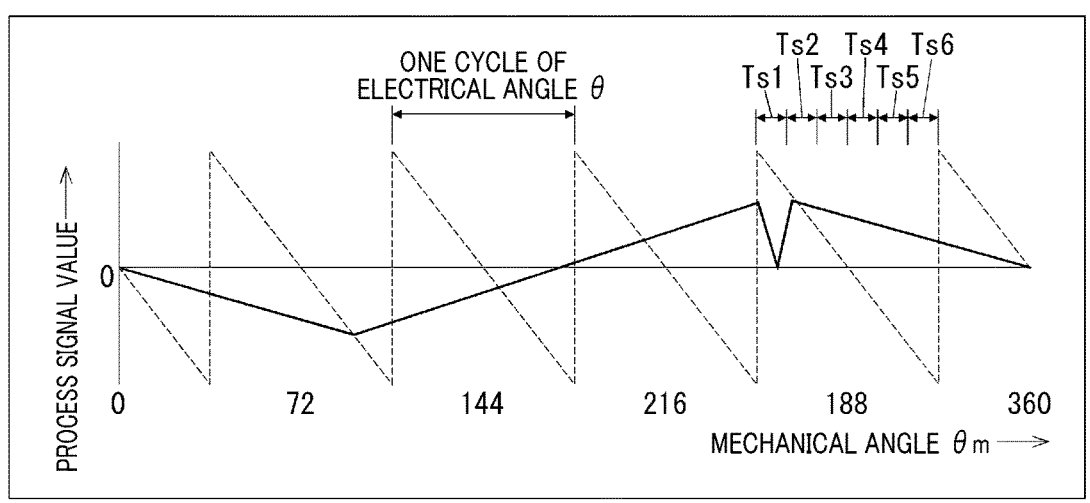
FIG. 6 shows a diagram showing a relationship between a waveform after performing predetermined process on an output signal of a magnetic sensor in FIG. 3, a mechanical angle, and an electrical angle.

The processed signal has a waveform as shown in FIG. 6, for example.

In the present embodiment, the signal examination unit 53 determines the signal as a special signal when a signal having amplitude equal to or greater than a predetermined value occurs for the same inter-switching period Ts for a predetermined number of times or more.

The signal determined as the special signal in FIG. 6 belongs to a first inter-switching period Ts1 which is the first inter-switching period Ts from the reference position of the electrical angle θ.

Returning to FIG. 4, the failed element identification unit 54 identifies the failed switching element based on the motor electric angle θ at which the special signal has been generated if there is a special signal.

In the present embodiment, the "electrical motor angle at which the special signal has been generated" is, for example, an electrical angle θ corresponding to the maximum amplitude of the special signal.

A relationship between the electrical angle θ at which the special signal has been generated and the failed switching element is obtained in terms of design and stored.

In the present embodiment, the above relationship is, for example, the following (1) to (6) (refer to FIG. 5).

(1) When the electrical angle θ at which the special signal has been generated belongs to the first inter-switching period Ts1, the failed switching element is the U-phase low potential side switching element.

(2) When the electrical angle θ at which the special signal has been generated belongs to the second inter-switching period Ts2, the failed switching element is the V-phase high potential side switching element.

(3) When the electrical angle θ at which the special signal has been generated belongs to the third inter-switching period Ts3, the failed switching element is the W-phase low potential side switching element.

(4) When the electrical angle θ at which the special signal has been generated belongs to the fourth inter-switching period Ts4, the failed switching element is the U-phase high-potential side switching element.

(5) When the electrical angle θ at which the special signal has been generated belongs to the fifth inter-switching period Ts5, the failed switching element is the V-phase low potential side switching element.

(6) When the electrical angle θ at which the special signal has been generated belongs to the sixth inter-switching period Ts6, the failed switching element is the W-phase high-potential side switching element.

Note that a relationship between the electrical angle at which the special signal has been generated and the failed switching element is different from the above (1) to (6) if a pattern of the switching operation performed during the lapse of one cycle from the reference position of the electrical angle θ is changed.

In the present embodiment, each functional section of the microcomputer 48 is enabled by software processing by executing a program stored in advance by a CPU.

[Process Executed by Microcomputer 48]

Next, a process executed by the microcomputer 48 to identify the failed switching element will be described with reference to FIG. 7.

Figure 7:
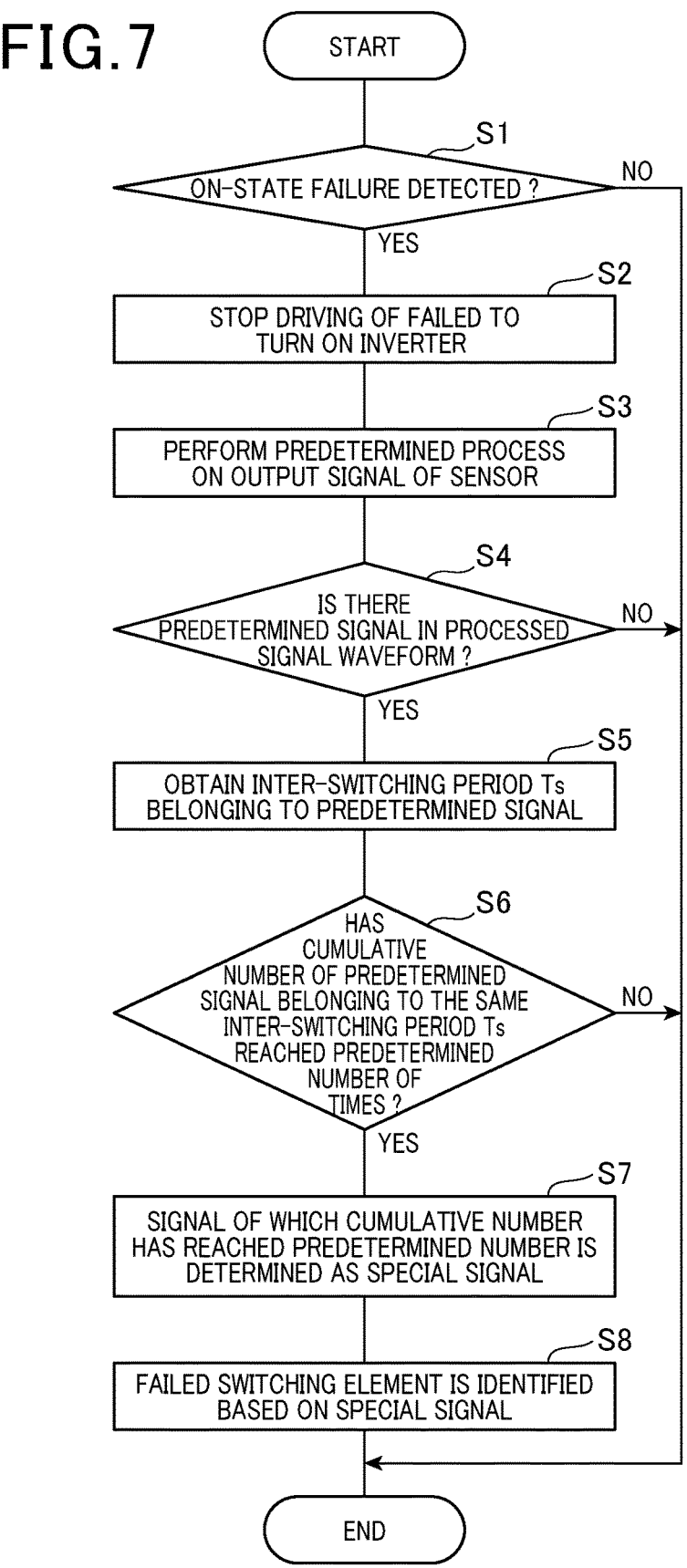
FIG. 7 shows a flowchart for explaining a process executed when a microcomputer of FIG. 3 identifies an ON-state failure location.

The process of FIG. 7 is repeatedly executed while the control section 45 is activated.

In step S1 of FIG. 7, it is determined whether or not an ON-state failure of the inverter 41 is detected.

When it is determined that the ON-state failure of the inverter 41 has been detected (S1: YES), the process proceeds to step S2.

When it is determined that the ON-state failure of the inverter 41 is not detected (S1: NO), the process exits the routine of FIG. 7.

In step S2, the driving of the inverter that failed to turn ON is stopped, and the driving of the other inverter is continued.

After step S2, the process proceeds to step S3.

In step S3, the predetermined process is performed on the output signal of the magnetic sensor 44.

After step S3, the process proceeds to step S4.

In step S4, it is determined whether or not there is a signal (hereinafter referred to as a predetermined signal) having an amplitude equal to or larger than a predetermined value in the signal waveform after processing in step S3.

When it is determined that there is a predetermined signal (S4: YES), the process proceeds to step S5.

When it is determined that there is no predetermined signal (S4: NO), the process exits the routine of FIG. 7.

In step S5, the inter-switching period Ts to which the predetermined signal found in S4 belongs is obtained.

After step S5, the process proceeds to step S6.

In step S6, it is determined whether or not a cumulative number of the predetermined signals belonging to the same inter-switching period Ts has reached the predetermined number of times.

When it is determined that the cumulative number of the predetermined signals has reached the predetermined number (S6: YES), the process proceeds to step S7.

When it is determined that the cumulative number of the predetermined signals has not reached the predetermined number (S6: NO), the process exits the routine of FIG. 7.

In step S7, it is determined that the predetermined signal that is determined to have reached the predetermined number of times in S6 is a special signal.

After step S7, the process proceeds to step S8.

In step S8, based on the previously stored relationship, the failed switching element is identified based on the electrical angle at which the special signal has been generated.

After step S8, the process exits the routine of FIG. 7.

[Effects]

As described above, in the first embodiment, the electronic control unit 40 includes two inverters 411, 412, the magnetic sensor 44, the failure detection unit 51, the inverter driving unit 52, the signal examination unit 53, and the failed element identification unit 54.

The magnetic sensor 44 detects the magnetic flux generated around the windings 381 to 383 and 391 to 393.

The failure detection unit 51 detects the ON-state failure of the inverter 41.

When the ON-state failure is detected, the inverter driving unit 52 stops driving the inverter 41 to which the ON-state failure has been detected, and continues driving the other inverter 41.

The signal examination unit 53 examines the presence or absence of the special signal.

When the special signal exists, the failed element identification unit 54 identifies the failed switching element based on the motor electric angle θ at which the special signal has been generated.

As described above, in the first embodiment, since the motor 20 is driven by the other inverter 41 even if one of the inverters 41 fails to turn ON, it is not necessary to stop the driving of the motor 20 when identifying the ON-state failure location.

Further, by utilizing the fact that the generation timing of the special magnetic flux is different for each switching element to which the ON-state failure occurs, it is possible to identify which switching element has failed to turn ON.

In this identification, the signal from the inverter that failed to turn ON is unnecessary.

Therefore, according to the first embodiment, it is possible to identify the switching element that has failed to turn ON while continuing the driving of the motor 20.

In addition, in the first embodiment, when the predetermined signal, which is a signal having the amplitude equal to or larger than the predetermined value, occurs more than the predetermined number of times in the same inter-switching period Ts, the signal examination unit 53 determines the predetermined signal as the special signal.

Therefore, it is possible to enhance the detection accuracy of the special signal and suppress errors from being detected.

Further, in the first embodiment, the windings 381 to 383 and 391 to 393 have lead wires 311 to 316 extending toward the switching element side.

The magnetic sensor 44 is disposed at a position capable of detecting the magnetic flux generated around the lead wires 311 to 316.

Therefore, the magnetic flux generated around the winding corresponding to the failed switching element can be detected.

Further, in the first embodiment, the magnetic sensor also serves as a position sensor for detecting the rotation angle of the motor 20.

Therefore, by detecting the special magnetic flux using the position sensor for controlling the motor, there is no need to provide a new sensor.

Second Embodiment

Figure 8:
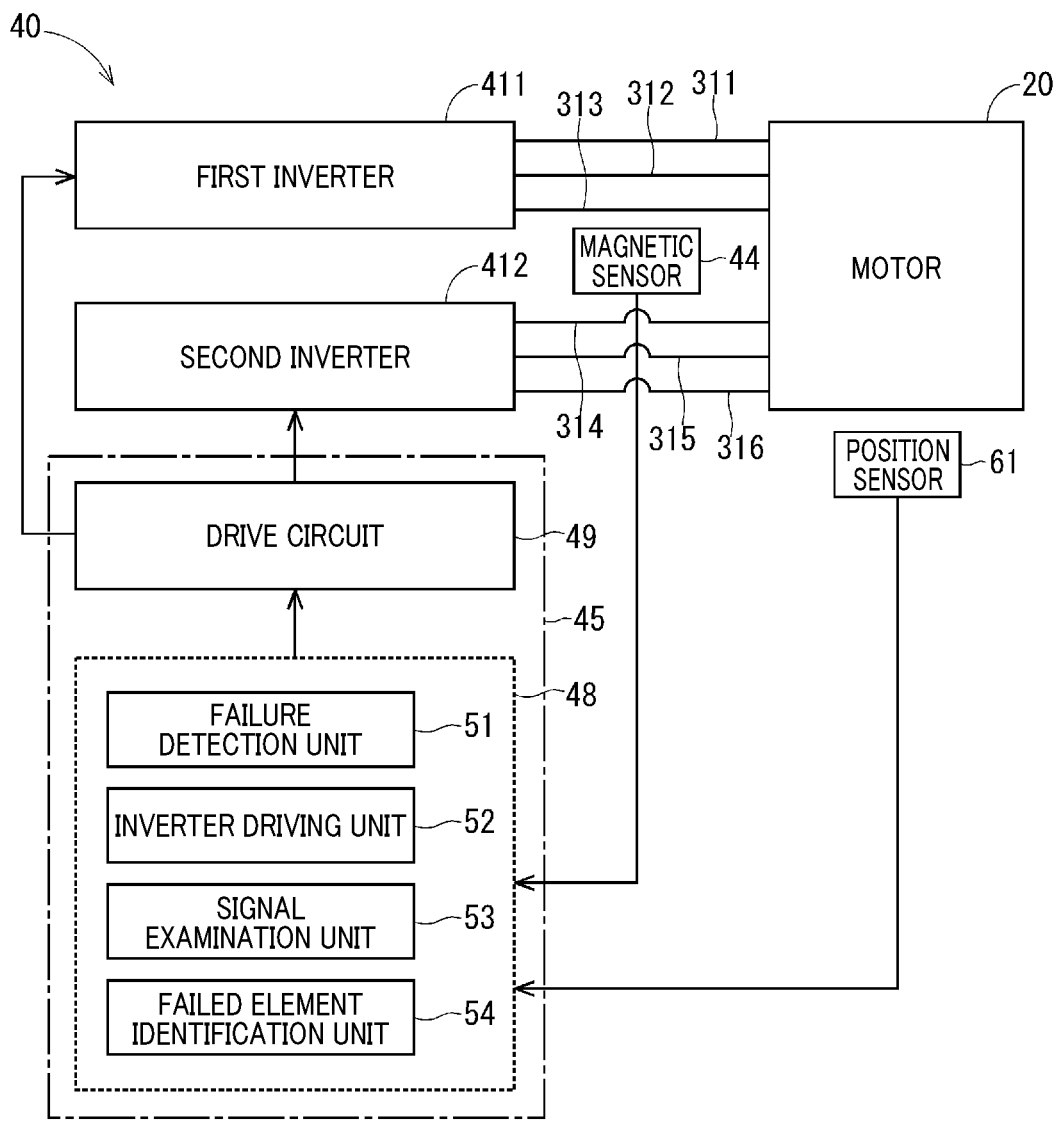
FIG. 8 shows a block diagram explaining an electronic control unit according to a second embodiment of the present disclosure.

In a second embodiment of the present disclosure, as shown in FIG. 8, a position sensor 61 for detecting the rotation angle of the motor 20 is further provided apart from the magnetic sensor 44.

In this way, the position sensor 61 may be provided separately from the magnetic sensor 44.

Third Embodiment

Figure 9:
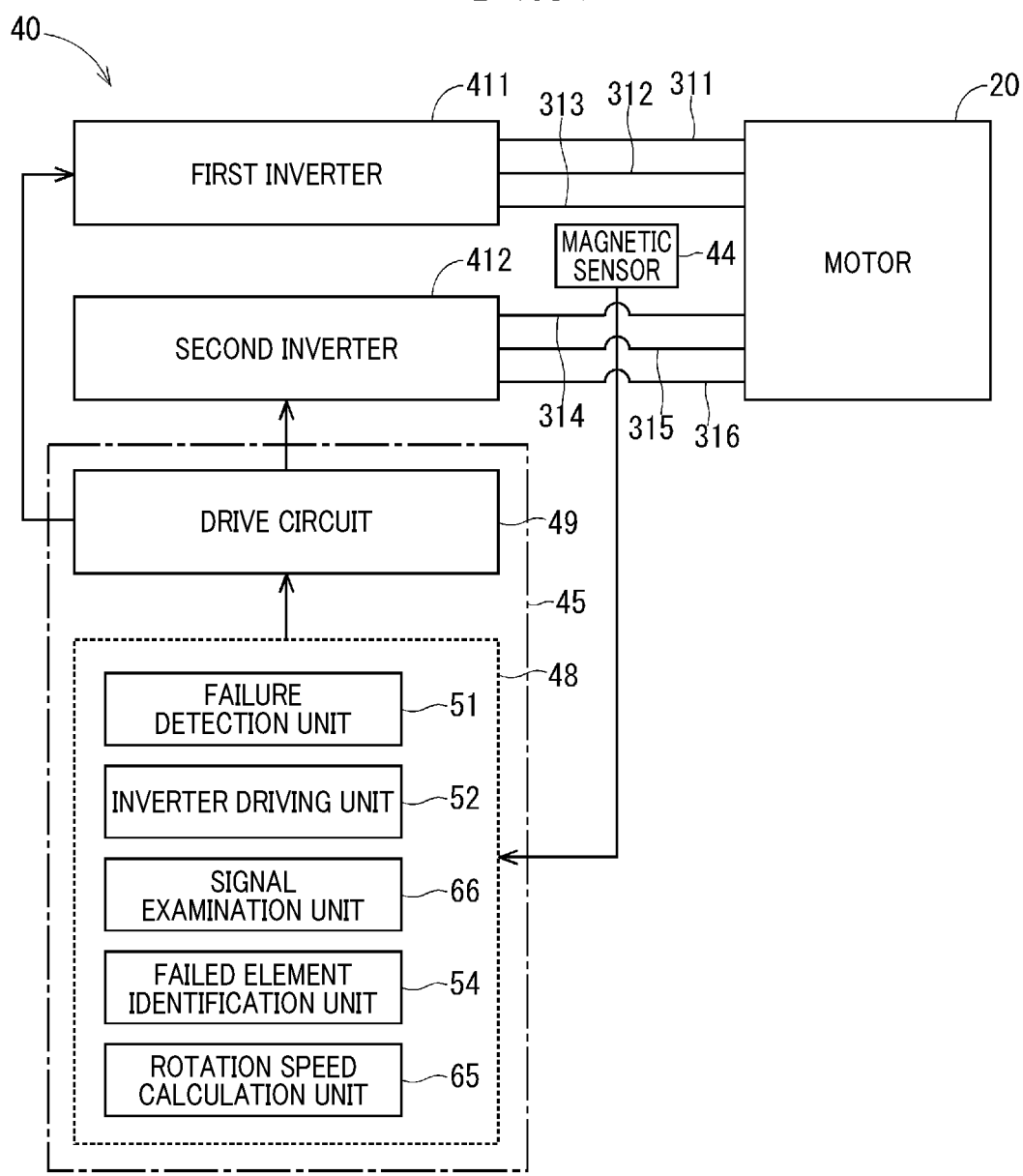
FIG. 9 shows a block diagram explaining an electronic control unit according to a third embodiment of the present disclosure.

In a third embodiment of the present disclosure, as shown in FIG. 9, a microcomputer 48 further includes a rotation speed calculation unit 65 that calculates the rotation speed of the motor 20 based on the rotation angle of the motor 20.

Further, when the rotation speed of the motor 20 is equal to or higher than the predetermined rotation speed, a signal examination unit 66 examines the presence or absence of a special signal based on the output signal of the magnetic sensor 44.

The special signal that appears according to the special magnetic flux increases as the rotation speed of the motor 20 increases.

Therefore, by examining the presence or absence of the special signal based on the output signal of the magnetic sensor 44 when the rotational speed of the motor 20 is equal to or higher than the predetermined rotational speed, it is possible to improve the detection accuracy of the special signal and suppress errors from being detected.

Fourth Embodiment

Figure 10:
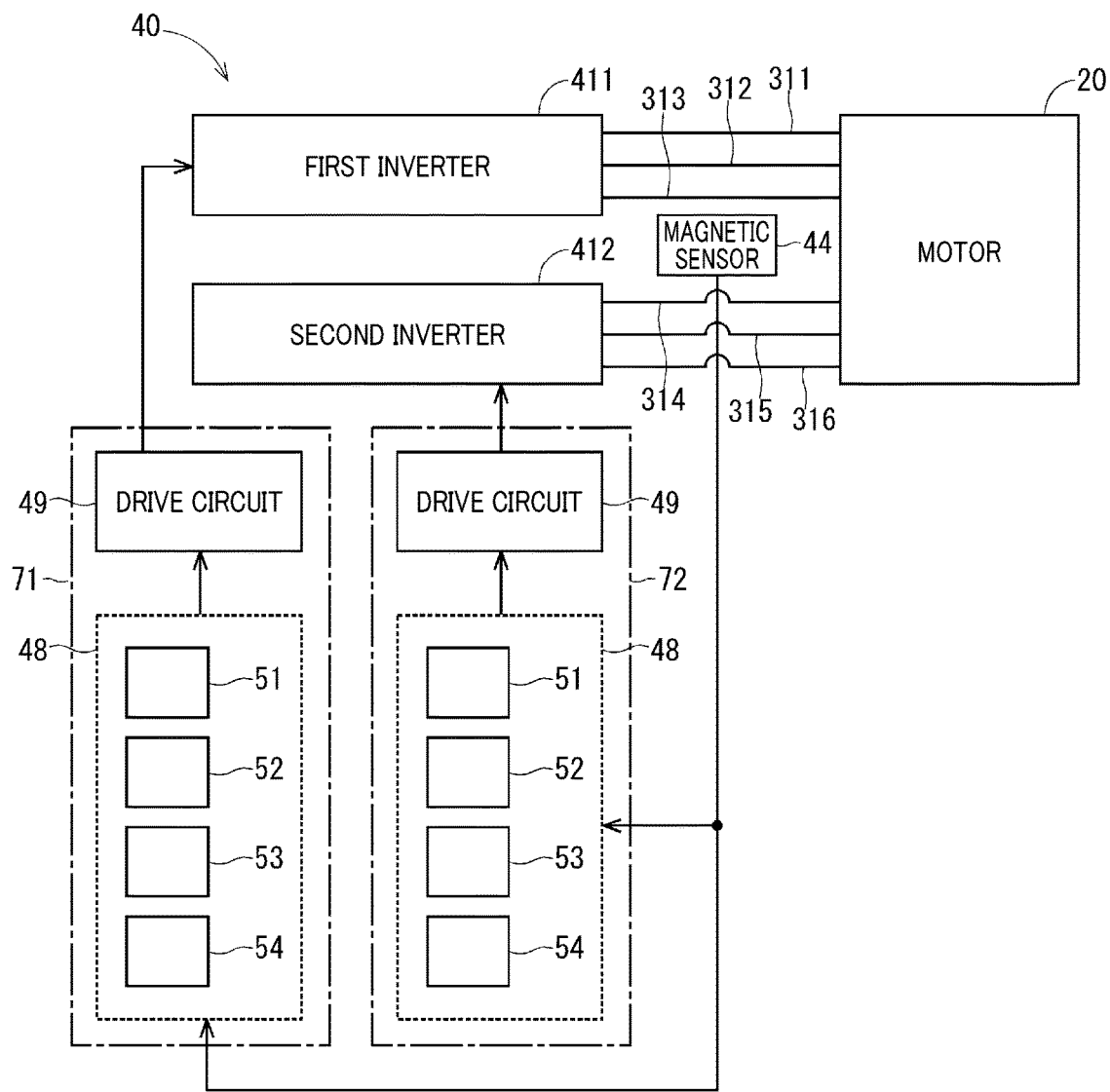
FIG. 10 shows a block diagram explaining an electronic control unit according to a fourth embodiment of the present disclosure.

In the fourth embodiment of the present disclosure, as shown in FIG. 10, two microcomputers 71, 72 each having a failure detection unit 51, an inverter driving unit 52, a signal examination unit 53, and a failed element identification unit 54 are provided.

The first microcomputer 71 is provided corresponding to the first inverter 411. The second microcomputer 72 is provided corresponding to the second inverter 412.

Other configurations of the microcomputers 71, 72 are the same as those of the microcomputer 45 of the first embodiment.

In the fourth embodiment, for example, when the ON-state failure of the first inverter 411 is detected, identification of the failed switching element by the failed element identification unit 54 of the first microcomputer 71 is continued while the driving of the first inverter 411 by the first microcomputer 71 is stopped.

As a result, the second microcomputer 72 can examine whether the determination of the ON-state failure by the first microcomputer 71 is correct or not.

Then if it is confirmed by the second microcomputer 72 that the first system is normal, on the assumption that the ON-state failure by the first microcomputer 71 is erroneously detected, restarting etc. of the drive of the first inverter 411 can be controlled.

That is, it is easy to recover from erroneous detection.

Other Embodiments

In another embodiment of the present disclosure, when two microcomputers are provided and an ON-state failure of a first inverter is detected, all control by the first microcomputer is stopped and the identification of the failed switching element of the first inverter may be performed by a failed element identification unit of the second microcomputer.

In another embodiment of the present disclosure, a part of the functional sections included in the microcomputer of the first embodiment may be enabled by hardware processing using a dedicated electronic circuit. In another embodiment of the present disclosure, the number of poles of a rotor may be other than ten.

The present disclosure is not limited to the above embodiment; however, various modifications are possible within the scope of the present disclosure.

What is claimed is:

1. A motor controller for controlling a motor having two systems of winding sets, the motor controller comprising:
   two inverters each provided for each winding set, two inverters having a plurality of switching elements for switching energization and de-energization of windings of each phase of the winding sets;
   a magnetic sensor that detects a magnetic flux generated around the winding;
   a failure detection unit that detects an ON-state failure of the inverters;
   an inverter driving section that continues to drive one of the inverters while stopping driving the other inverter in which the ON-state failure has been detected when the ON-state failure is detected by the failure detection unit, wherein the location of the ON-state failure corresponds to a failed switching element, the failed switching element being amongst the plurality of switching elements included in the inverter that has been stopped;
   a signal examination unit that examines a presence or absence of a special signal wherein the special signal is a signal appearing in accordance with a special magnetic flux among a waveform of an output signal of the magnetic sensor or a waveform after a predetermined process is applied to the output signal of the magnetic sensor, wherein the special magnetic flux is a magnetic flux generated around the winding corresponding to the failed switching element by a brake current that is generated as the motor rotates when there is an ON-state failure; and
   a failed element identification unit that identifies the failed switching element based on a motor electrical angle at which the special signal has been generated if the special signal is present.

2. The motor controller according to claim 1, wherein, when each of periods obtained by dividing one period of the motor electrical angle from a reference position by the timing at which a switching operation of the switching element is performed is defined as an inter-switching period; and
when a signal having amplitude equal to or greater than a predetermined value occurs for the same inter-switching period for a predetermined number of times or more, the signal examination unit determines the signal as the special signal.

3. The motor controller according to claim 1, wherein, the winding has a lead wire extending toward a switching element side; and
the magnetic sensor is disposed at a position capable of detecting a magnetic flux generated around the lead wire.

4. The motor controller according to claim 1, wherein, the magnetic sensor also serves as a position sensor for detecting a rotation angle of the motor.

5. The motor controller according to claim 1, wherein, the motor controller further includes a position sensor for detecting a rotation angle of the motor apart from the magnetic sensor.

6. The motor controller according to claim 4, wherein, the motor controller further includes a rotation speed calculation unit that calculates a rotation speed of the motor based on the rotation angle of the motor; and
the signal examination unit examines a presence or absence of the special signal based on the output signal of the magnetic sensor when the rotation speed of the motor is equal to or higher than the predetermined rotation speed.

7. The motor controller according to claim 1, wherein, the motor controller includes two microcomputers each including the failure detection unit, the inverter driving unit, the signal examination unit, and the failed element identification unit;
when a microcomputer provided corresponding to the inverter of the first system is defined as a first microcomputer and a microcomputer provided corresponding to the inverter of the second system is defined as a second microcomputer,
when the ON-state failure of the inverter of the first system is detected, identification of the failed switching element by the failed element identification unit of the first microcomputer is continued while the driving of the inverter of the first system by the first microcomputer is stopped.

* * * * *